United States Patent [19]

Wiggin et al.

[11] Patent Number: 4,741,257
[45] Date of Patent: May 3, 1988

[54] FUME HOOD AIR FLOW CONTROL

[75] Inventors: Merlon E. Wiggin, Long Island, N.Y.; Robert H. Morris, Randolph, N.J.

[73] Assignee: Air Monitor Corporation, Santa Rosa, Calif.

[21] Appl. No.: 690,093

[22] Filed: Jan. 9, 1985

[51] Int. Cl.⁴ .............................................. B08B 15/02
[52] U.S. Cl. ..................... 98/115.3; 98/1.5
[58] Field of Search ................. 98/1.5, 115.3, 115.1

[56] References Cited

U.S. PATENT DOCUMENTS

| 3,111,077 | 11/1963 | Cortright | 98/115.3 |
| 3,951,336 | 4/1976 | Miller et al. | 98/1.5 |
| 4,113,175 | 9/1978 | Sutton, Jr. | 98/1.5 X |
| 4,160,407 | 7/1979 | Duym | 98/115.3 X |
| 4,215,627 | 8/1980 | Garriss | 98/115.3 |
| 4,261,256 | 4/1981 | Joret | 98/1.5 X |

FOREIGN PATENT DOCUMENTS

| 59-38541 | 3/1984 | Japan | 98/1.5 |
| 2072331 | 9/1981 | United Kingdom | 98/115.3 |
| 2097527 | 11/1981 | United Kingdom | 98/115.3 |
| 283540 | 6/1971 | U.S.S.R. | 98/115.3 |

Primary Examiner—Harold Joyce
Attorney, Agent, or Firm—James F. Mitchell

[57] ABSTRACT

A control system is provided for providing a constant flow of air through a chamber, such as a fume hood, by measuring the pressure of the air outside of the hood and comparing it with the pressure of the air within the hood and adjusting the flow of air to achieve a constant pressure difference. The system is particularly applicable to fume hoods which have a sash which can be opened or closed or left in intermediate position; the present system will provide a constant air flow through the hood regardless of the sash position.

5 Claims, 2 Drawing Sheets

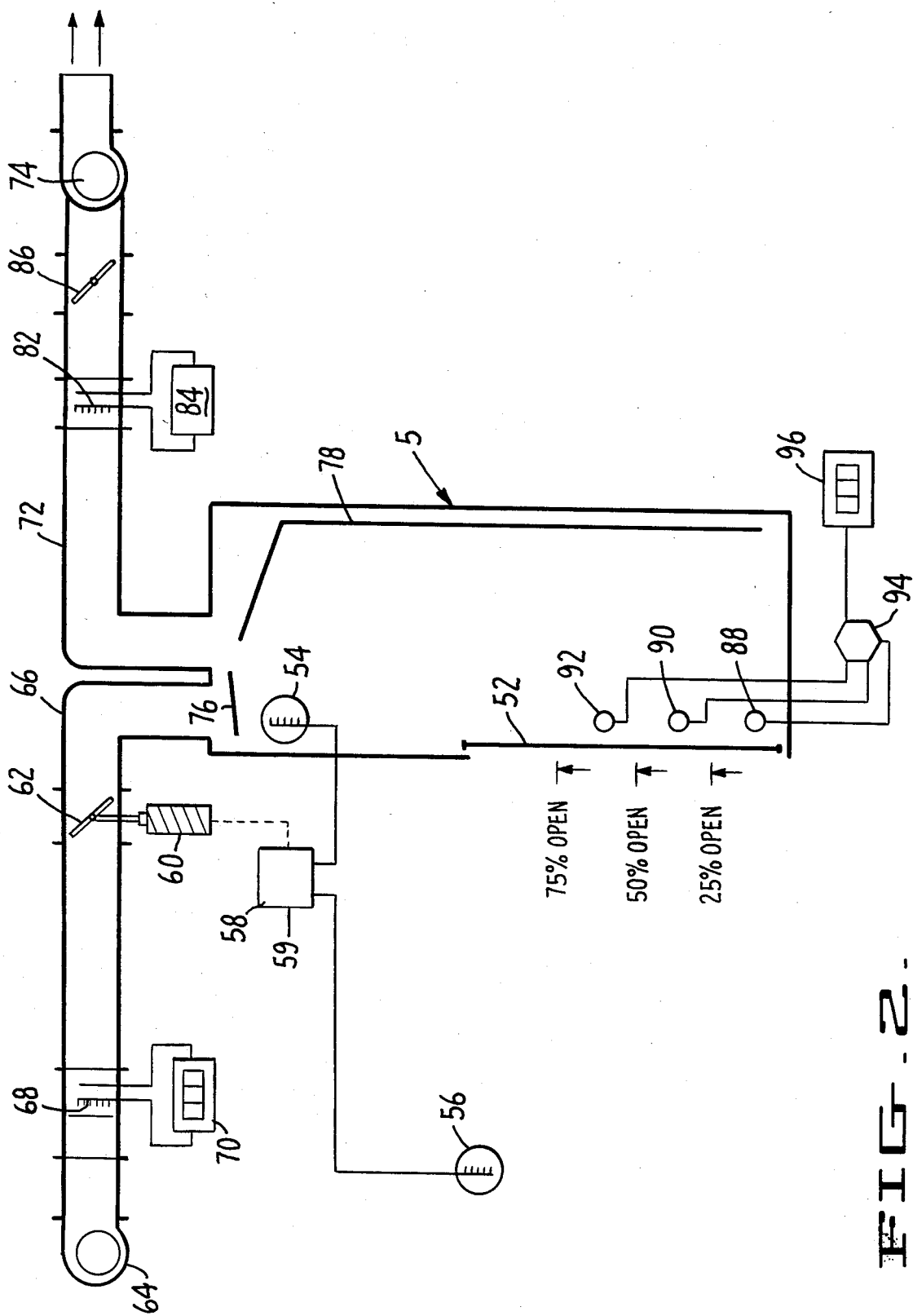

FUME HOOD AIR FLOW CONTROL

BACKGROUND OF THE INVENTION

The fume hood is one of the most common pieces of laboratory equipment and also one whose performance is most subject to question. The primary purpose of its design was, and is, safety; viz. the protection of the worker within the laboratory, medical or industrial environment by effective prevention of "spillage."

The ideal operating characteristics of a fume hood include:

1. Minimum face velocity to ensure capture.
2. Constant face velocity in all sash positions.
3. Hood operation, including sash positions, will not impact the room and corridor space static pressure relationship.
4. Be energy conservative by exhausting only the amount of conditioned air necessary to maintain the required face velocity.
5. Minimum impact of capture capability by room environmental conditions.
6. Absence of obstruction, including dampers in hood exhaust system that act as collectors of contaminants.
7. Maintenance of exhaust duct velocities to prevent loss of conveyance capabilities.
8. Maintain exit air velocities so as to minimize any re-entry of exhaust.

The present invention provides these desired operating characteristics.

A number of operational problems are experienced with fume hoods constructed in accordance with the prior art. These include:

1. Widely varying face velocities from too low to ensure "capture" to higher than necessary. Tests prove that higher face velocities as 150 f.p.m. are not necessarily safer, and that the 80 to 100 range can provide good protection, and in some cases as low as 65 f.p.m., provided the hood's surrounding environment does not adversely impact its operation. Conventional hoods and most bypass hoods have unnecessarily high face velocities in low percent sash open position.
2. High energy costs. Fume hoods notoriously exhaust large amounts of conditioned air, and with the increased fuel costs the older air systems with constant volume supply and reheat coils, coupled with the hood exhaust always on and set for maximum sash openings, is very inefficient from an energy standpoint.
3. Disruption of room/corridor space static pressure relationship from changing of sash positions, or from cycling of hoods on and off.
4. Complaints from "users" with auxiliary air hoods when minimally conditioned air is used. It has also been reported that auxiliary air below room temperature may impair hood performance.
5. Condensation of vapors, collection of dusts, potential explosive conditions, etc. in hoods and exhaust ducts when exhaust volumes are reduced below design. These conditions may occur as a result of attempts to reduce energy by reducing flows based on sash position and by shutting down non-used hoods on a system.
6. Exit velocity from hoods exhaust system so low that re-entry becomes a problem. This condition is a companion result to paragraph 5 above.

Attempts to reduce fume hood energy include auxiliary air, heat recovery systems ("heat wheels" and "run around"), and reduction of exhaust flows to match lower sash positions and shutting down, or reducing hood flow, when units are not in use. Several surveys have shown that fume hoods are only needed or used at capacity (full flow exhaust) about 15% to 20% of the time. These kinds of energy reduction attempts have been mixed in their effectiveness. Auxiliary air hoods are expensive to install, savings are limited, and operator discomfort has been a common complaint. Problems with energy recovery systems include contamination of supply air, limited effectiveness, and high cost. The systems developed to reduce hood exhaust as functions of face velocity have generally been expensive and not able to maintain face velocity much better than the bypass units. Control has usually been with dampers, variable speed drive, or two speed fans. While energy use has been reduced, problems have arisen from chemical precipitation, below minimum conveyance velocities, explosive conditions, and exhaust air reentry because of below designed exit velocities.

In accordance with the present invention, a better system has been developed for fume hood operation that ensures the "capture" capability with the lowest practical face velocity.

Assuming the hood can be properly located and installed, the single most effective method of energy conservation is the control of face velocity or, in other words, exhaust only the amount of room air necessary to maintain a pre-determined or set face velocity.

SUMMARY OF THE INVENTION

Summing up the above, the present invention provides a fume hood or similar chamber with a means for maintaining a constant velocity of air through the face of the chamber regardless of the sash position. This not only provides for safe operation of the hood, but also for great energy savings by not exhausting excessive amounts of room air.

BRIEF DESCRIPTION OF THE DRAWINGS

FIG. 2 is a side elevation of a similar system which provides for the admission of outside air to maintain a constant flow of exhaust air regardless of the sash position.

DESCRIPTION OF THE PREFERRED EMBODIMENTS

Figure 1:
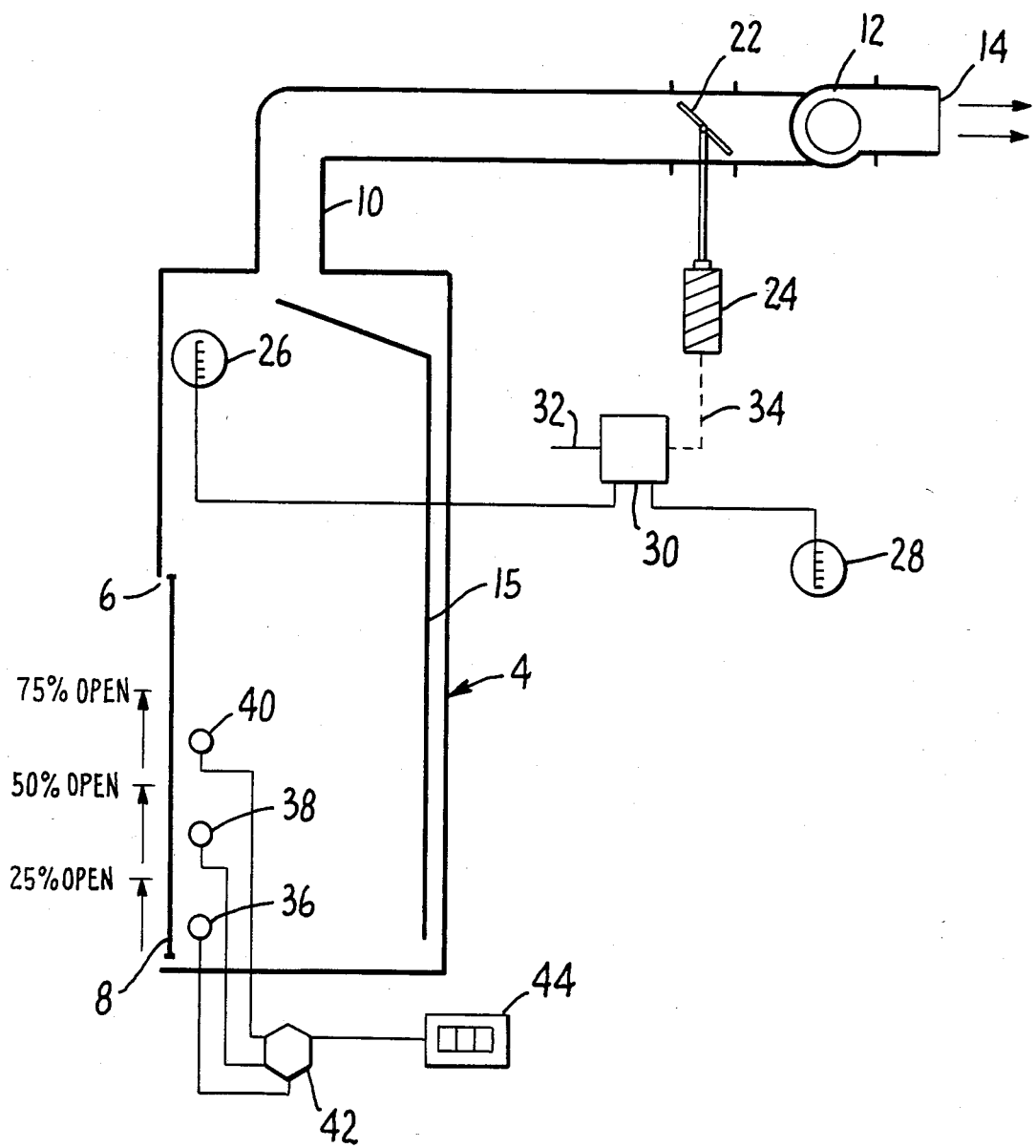
FIG. 1 is a side view of a fume hood with controls embodying the present invention which provides a substantially reduced flow of exhaust air and with a constant flow velocity regardless of the sash position of the fume hood.

Referring now to the drawings by reference characters, there is shown in FIG. 1 a fume hood generally designated 4 having an opening 6 which is closeable to varying degrees by means of a sash 8 which can be raised and lowered. The fume hood has an exhaust port 10 and air can be pulled through this port by means of fan 12 and exhausted through pipe 14. Baffle 15 aids in the distribution of air within the hood. The amount of air passing through exhaust port 10 can be controlled by means of a damper 22 having an electronic actuator 24. A suitable actuator is available on the market under the trade name ACTRON. The equipment described thus far is conventional in fume hoods.

In accordance with the present invention, a constant face velocity is provided in the fume hood, regardless of the position of the sash 8 by means of a first pressure sensor 26 which senses the pressure in the hood and a second sensor 28 which senses the pressure of the ambient air of the room or other place where the fume hood is located. The pressure readings from the hood static pressure probe 26 and the room static pressure probe 28 are fed to a pressure differential transmitter 30. A suitable pressure differential transmitter is sold under the trade name of VELTRON 5000. The pressure differential transmitter is provided with an adjustment lever 32 so that one can set the pressure differential transmitter at a desired pressure difference. The pressure transmitter is connected by line 34 to the damper actuator 24 which actuates the damper to maintain the desired pressure difference between the interior of the hood, as sensed at 26 and the ambient pressure as sensed at 28. Thus, one can determine the desired air flow through the hood and adjust the pressure differential transmitter by means of the lever 32 to the desired differential and this pressure differential will be maintained within the hood regardless of whether the sash 8 is closed, fully opened, or opened to some intermediate point.

In order to initially adjust the pressure differential transmitter to the desired pressure difference, a plurality of flow tubes, (available under the brand name VOLU-PROBE) designated 36, 38 and 40 are connected to a selector switch 42 and a digital readout 44. This setup would ordinarily be used only in the initial installation or test of the controls so that one could adjust the pressure differential transmitter to the desired flow rate and also check that the desired flow rate was maintained regardless of the position of the sash 8.

One possible problem with a relatively simple setup such as that shown in FIG. 1 is that there will be substantially no flow through the exhaust system when the sash is closed. This leads to several disadvantages, particularly the possibility of condensation of hazardous substances within the exhaust system. In order to remedy this, the system of FIG. 2 may be employed which has the same basic control setup as that shown in FIG. 1 except that a bypass is provided so that outside air is drawn through the exhaust system even if the sash is completely closed.

Thus, in FIG. 2, a fume hood generally designated 50 is provided with a sash 52, a pressure sensor 54 for sensing the pressure inside the hood and a second sensor 56 for sensing the ambient pressure. These are connected to a pressure differential transmitter 58 as before and the pressure difference operates the damper actuator 60 which in turn operates the damper proper 62. In this case, an intake fan 64 is provided in the duct 66. A flow sensor 68 and readout 70 may also be provided. In this embodiment of the invention, 66 serves as an inlet and pipe 72 connected to the exhaust fan 74 serves as an outlet. Air is prevented from directly entering the fume hood by means of a first baffle 76 while a second baffle 78 is at the back of the fume hood as previously described. The outlet 72 may be provided with a pressure sensor 82 and readout 84 as well as a manual damper 86, but these are not essential to the operation of the invention. As before, the temporatily installed probes 88, 90 and 92 leading to switch 94 and readout 96 provide means for determining the air flow when the sash 52 is in various positions. This, of course, enables one to set the control lever 59 on the pressure differential transmitter so that the device will operate at the desired pressure differential. In this embodiment of the invention, the air flow out through the outlet 72 is substantially constant regardless of the position of the damper 62 and the corresponding position of the sash 52. In other words, as the sash is closed, most of the air flowing out through pipe 72 will bypass the fume hood while, if the sash 52 is open to any degree, there will be a corresponding closing of the damper 62 which will result in a substantially constant flow through the pipe 72.

Although certain specific embodiments of the invention have been described, it will be understood that the invention is one of broad applicability and that many variations can be made in the exact structure shown without departing from the spirit of this invention. For instance, a differential pressure transmitter is employed, but one could instead have a flow application using a flow transmitter with internal square root extractor and an electronic modulating damper actuator, eliminating the normal receiver controller described above.

We claim:

1. An apparatus for controlling the face velocity of air flowing through a variable sash opening between a room and a chamber, such as a fume hood, having an exhaust port leading outside said room and having air moving means to move air from said room, through said chamber and out through said exhaust port comprising in combination:
   (a) means for measuring the static air pressure within said room;
   (b) means for measuring the static air pressure within said chamber; and
   (c) means for maintaining a constant differential in static air pressure between said chamber and said room regardless of the amount of said variable sash opening.

2. An apparatus for controlling the face velocity of air flowing through a variable sash opening between a room and a chamber, such as a fume hood, having an exhaust port leading outside said room and means moving air from said room through said chamber and out through said exhaust port comprising:
   (a) a first static pressure sensor measuring the static air pressure within said room;
   (b) a second static pressure sensor measuring the static air pressure within said chamber;
   (c) differential pressure transmitter means responsive to the difference in static air pressure measured by said first and second air sensors; and
   (d) a damper in said exhaust port having its position controlled by said differential pressure transmitter to maintain a constant differential in the static air pressure measured by said sensors regardless of the position of said variable sash opening.

3. The apparatus of claim 2 wherein said pressure differential transmitter has adjustment means thereon where one may preset the desired pressure differential between said room and said chamber static pressure sensors.

4. The apparatus of claim 2 having means for determining the face velocity of air flow at the sash when said sash is in varying positions.

5. The structure of claim 4 wherein said means is a plurality of face velocity air flow gauges located adjacent to said sash connected to a switchable velocity readout whereby one can determine the velocity of air flowing through said open sash at its various positions.

* * * * *